Figure 3:
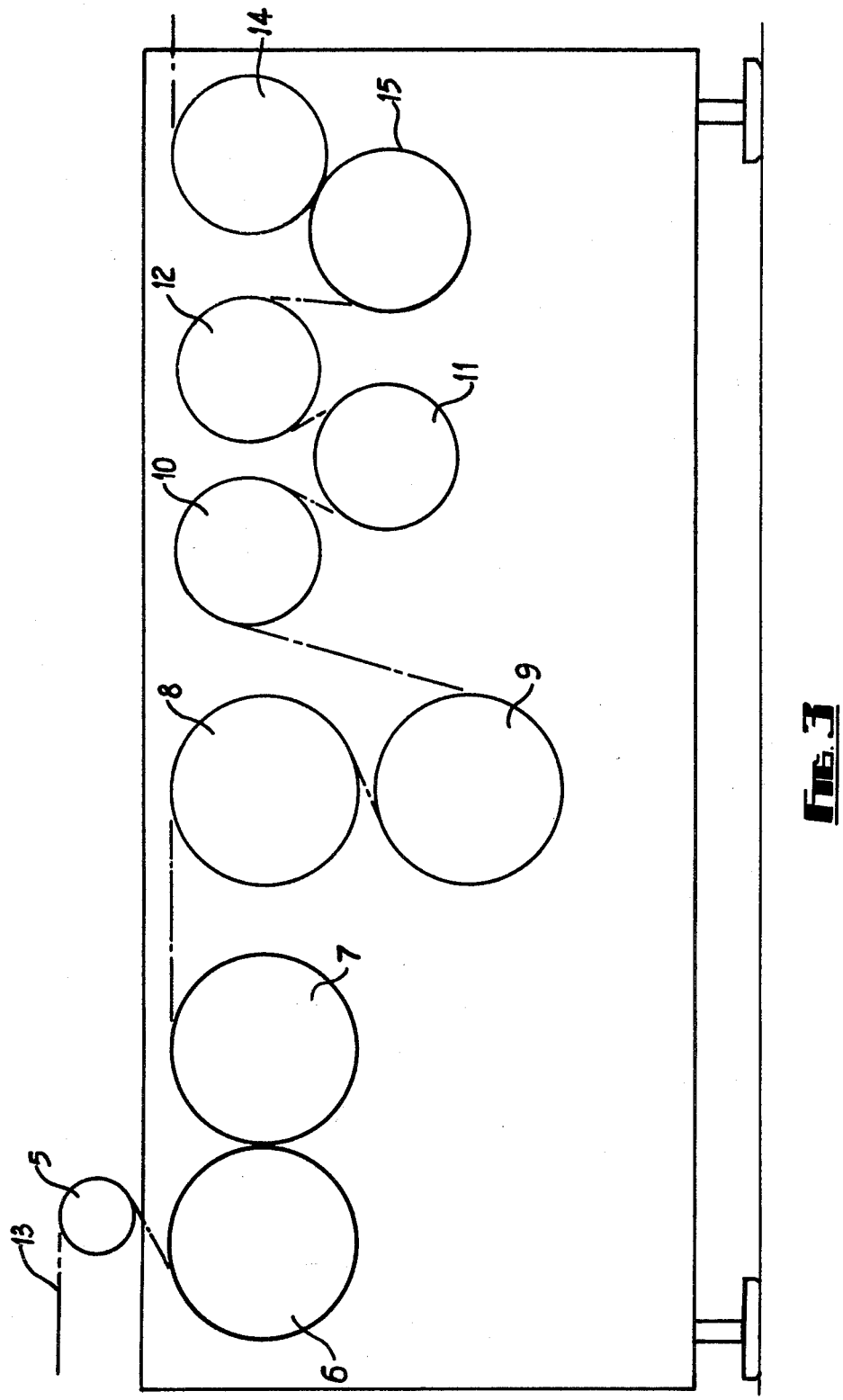

United States Patent [19]

Aspin

[11] 3,988,101
[45] Oct. 26, 1976

[54] MACHINES FOR TREATING FILAMENTS OF PLASTICS MATERIALS

[76] Inventor: Frank Metcalf Aspin, Barnacre, Bexton Lane, Knutsford, Cheshire, England

[22] Filed: May 7, 1975

[21] Appl. No.: 575,967

[30] Foreign Application Priority Data

May 8, 1974 United Kingdom............... 20196/74
May 8, 1974 United Kingdom............... 20199/74

[52] U.S. Cl................................. 425/363; 425/335
[51] Int. Cl.² ..................... B29C 17/00; B29D 7/00; B29C 25/00
[58] Field of Search............................ 425/335, 363

[56] References Cited
UNITED STATES PATENTS

| | | | |
|---|---|---|---|
| 2,928,124 | 3/1960 | Hugger | 425/335 X |
| 3,499,185 | 3/1970 | Schmidt et al. | 425/335 |
| 3,531,827 | 10/1970 | Drogonette | 425/335 X |
| 3,565,730 | 2/1971 | Weisshuhn | 425/363 X |
| 3,570,052 | 3/1971 | Reode | 425/335 |
| 3,581,340 | 6/1971 | Thieme | 425/363 X |

Primary Examiner—J. Howard Flint, Jr.
Attorney, Agent, or Firm—Spencer & Kaye

[57] ABSTRACT

There is disclosed apparatus for the treatment of films of plastics material which comprises at least a basic unit having, in one section, grooved and heated roll means, and in another, following section, godet rolls. In use, films of fibrillatable plastics material, such as of polypropylene, which have been profiled to exhibit a plurality of parallel longitudinal enlarged portions, can be conveniently heated and hot-stretched, the grooved roll means being very effective for heating and traction purposes. The apparatus may include other units, and there may be additional sections in the basic unit, all preferably constructed on a modular system for cheapness and ease of assembly.

10 Claims, 6 Drawing Figures

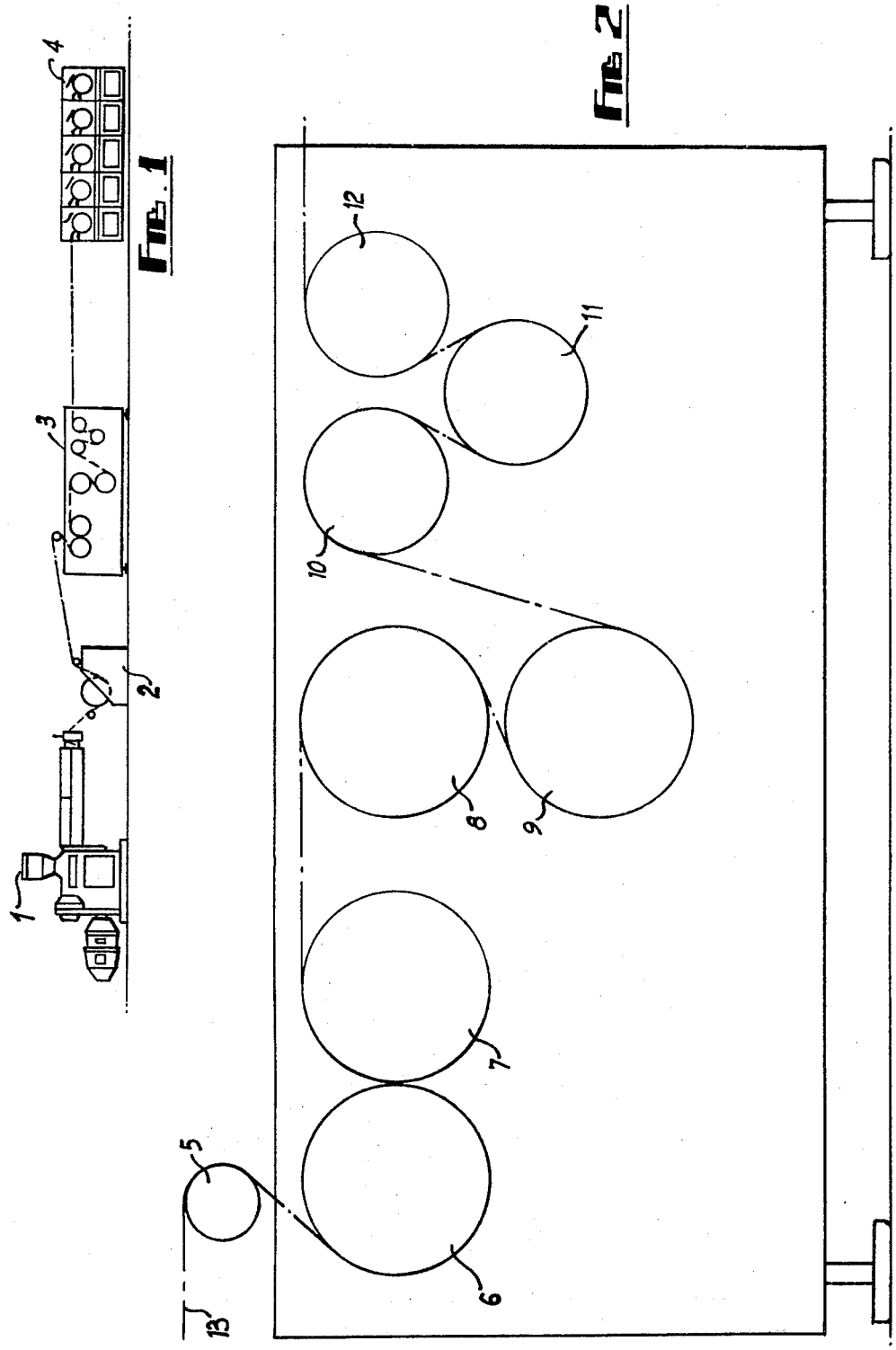

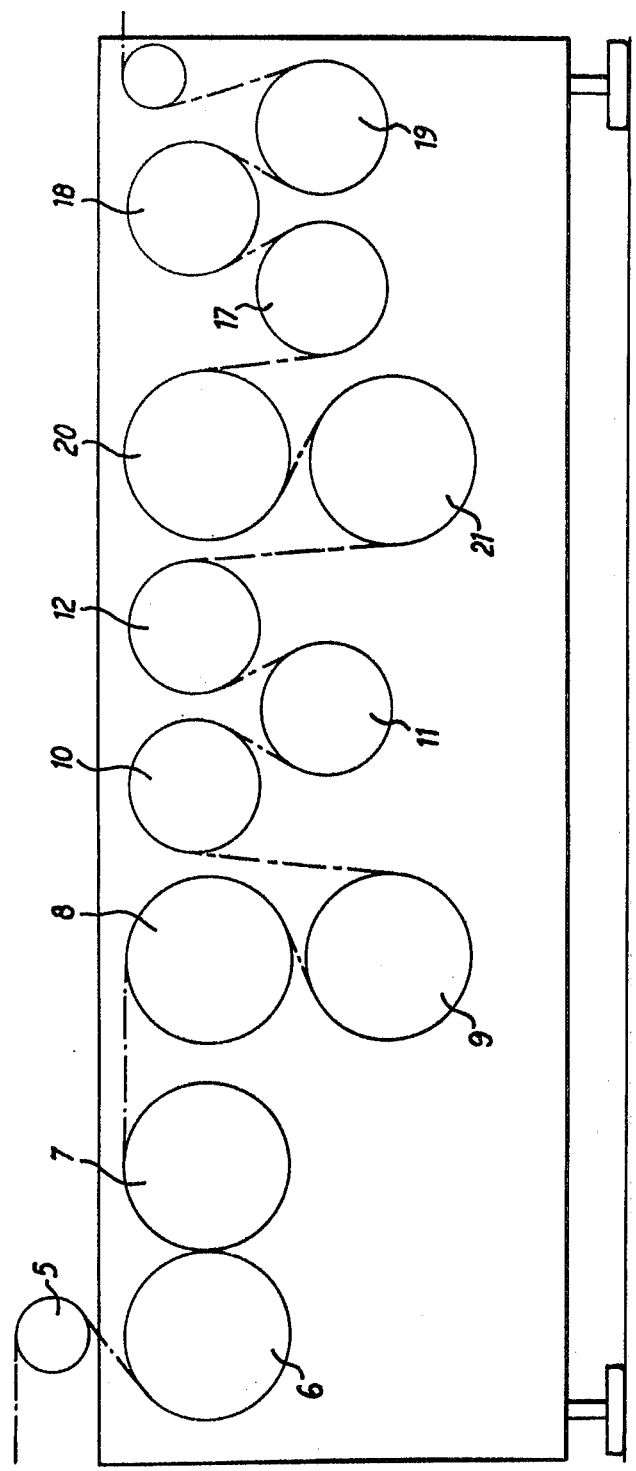

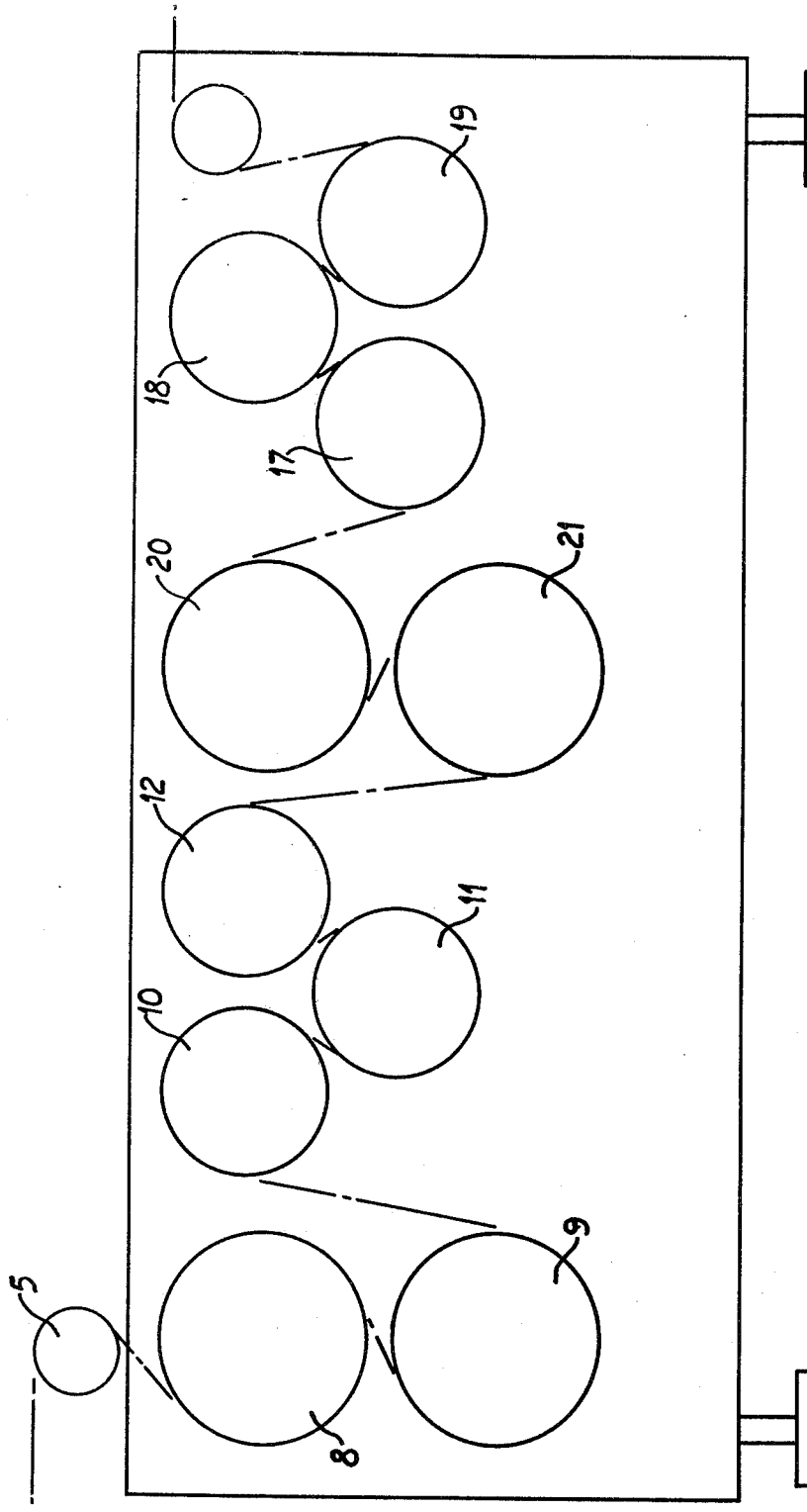

MACHINES FOR TREATING FILAMENTS OF PLASTICS MATERIALS

This invention concerns the treatment of films of plastics material, such as polypropylene, which can be produced with such characteristics that when stretched in a given direction by an appropriate amount and under appropriate conditions become so weakened in a direction transverse to the direction of stretch that they can readily be divided to provide longitudinal strands, and so strengthened in the direction of stretch that the strands have a strength adequate for textile applications (hereinafter called "films of plastics material of the type described"). The words "textile applications" are to be understood in a broad sense. For example the conversion of the strands into, or the use of the strands as, cord, twine thread or yarn is contemplated.

The object of the present invention is to provide an improved apparatus suitable for treating films of plastics material of the type described.

According to the present invention apparatus for the treatment of films of plastics material of the type described comprises a basic unit adapted to receive such film from a supply thereof and deliver it to collection means, and including, in one section, roll means, with peripheral annular grooves, and means for facilitating the heating of said roll means, whereby film, having a plurality of parallel longitudinal enlarged portions from which strands are to be produced, may, with the enlarged portions lying in said annular grooves, be progressed and at the same time heated to a temperature suitable for hot-stretching same, and, in another, following section, godet rolls whereby the film may be stretched in its passage between the two sections. The apparatus may further include, in a third section of said basic unit, preceding said one section, nip rolls, at least one of said rolls having peripheral annular grooves, and means for facilitating the heating of said nip rolls, whereby flat film entering the unit may be profiled to provide said enlarged portions. Each of the nip rolls may be grooved peripherally, the grooves being in alignment. Especially in such cases it is desirable that the roll means in said one section consists of two rolls, each having peripheral annular grooves, disposed adjacent each other and adapted to be rotated in opposite directions so that one side of the film may be against one roll and the other side of the film against the other roll. The nip rolls instead of being incorporated in a section of the basic unit, may be part of a preceding unit. In some cases the godet rolls may also have peripheral annular goooves to accommodate the enlarged portions. The basic unit may incorporate additional sections, such as a terminal section following the godet rolls and which includes crimping rolls. The units are preferably of modular construction for ease of assembly in one sequence or another.

It has been discovered that the provision of grooved heating rolls, and, usually, grooved godet rolls, is so effective from the point of view of heating and traction that the need for large ovens, and multi-roll assemblies for progressing the film, is avoided. As a result the apparatus of the present invention is compact and relatively inexpensive considering the operations which it carries out.

The invention will now be described further, by way of example only with reference to the accompanying drawings, in which, FIG. 1 is a diagram of a machine line incorporating apparatus according to the present invention for carrying out the successive operations, on a film of plastics material of the type described, of cross-sectional modification, heating, and stretching, FIG. 2 is a diagram to an enlarge scale of part of the machine line of FIG. 1, and FIGS. 3 to 6 are diagrams of modified versions of the part of the machine line shown in FIG. 2.

Referring to FIG. 1 a line of machines for producing fibre from polypropylene film consists of an extruder 1, a chill roll assembly 2, a fibre producing unit 3, and multiple winder 4. The polypropylene film is initially produced in the extruder 1, chilled and sized in the chill roll assembly 2, reduced to fibrous form in the unit 3, and the fibrous material is wound up on several packages in the winder 4. The extruder 1, the chill roll assembly 2 and the winder 4 are all of known and conventional construction and will therefore not be described further.

The unit 3 will now be described in detail with reference to FIG. 2. It consists of three sections. The first section incorporates an idler roll 5 and a pair of profiling or embossing rolls 6, 7, the peripheries of both of which have machined annular grooves of generally V-section with a small land between each. The shape and spacing of the grooves will depend on the cross-sectional shape and the size of fibre it is wished to produce but the pitch of the grooves will usually be less than 0.75 millimetres with lands of 0.04 millimetres or less. It will therefore be appreciated that the machining of the grooves must be precise and the mounting of the rolls must be accurate. The roll 6 is adjustable hydraulically so that the two rolls may be separated for threading up the apparatus with film and so that a suitable nip load may be applied. The rolls are heated by internally circulated oil. There is disclosed in the specification of my British Patent No. 1,380,701 a grooved roller, and bearing and heating arrangements therefor, suitable for use in the apparatus presently being described.

The second section incorporates two heating rolls. These rolls are of similar construction to the rolls 6, 7, being correspondingly grooved, and heated. The grooves need not however be specially profiled at their bottoms since they are not embossing grooves.

The third section incorporates three godet rolls 10, 11, 12 which are also grooved like the heating rolls 8, 9, but are not heated. The grooves however would have a smaller included angle to aid in gripping the fibre.

Each section will of course include adjustable drive means for the various rolls, and is constructed on a modular basis for bolting to adjacent sections so that assembly is quick and simple, as is replacement or addition of a section.

In operation the film 13 passes, as shown, around the idler roll 5 and then through the heated nip of rolls 6, 7. The film 13 as a result is profiled or embossed so that in cross-section it has a succession of enlarged portions, forming incipient strands connected by very short, very thin portions, just sufficient to preserve the transverse continuity of the film. In some cases the enlarged portions may be partially or wholly separated. The profiled film then passes around heating rolls 8, 9, and it is found that the enlarged portions readily occupy the grooves in these rolls and are very effectively and quickly heated before passing over the cold godet rolls 10, 11, 12 in similar fashion. The godet rolls, 10, 11, 12 are driven so that their peripheral speed is several times greater than the peripheral speed of the rolls 6, 7, 8, 9 with the result that the film is hot-stretched in the interval between the roll 9 and the roll 10 by a corresponding amount.

As a consequence of the embossing and hot-stretching the film is converted into a plurality of separate strands or fibres a certain number of which are then wound onto each of a series of packages carried by the winder 4.

FIG. 3 illustrates a unit modified by the inclusion of a fourth section incorporating a pair of strand-deforming rolls 14, 15, the other parts being numbered as before. The rolls 14, 15 have intermeshing or abutting axially-directed teeth on their peripheries which impart crimp, or alternately large and small cross-sectional areas, as the case may be, to the strands passing therebetween. Of course, one roll may be plain and the other toothed.

Figure 4:
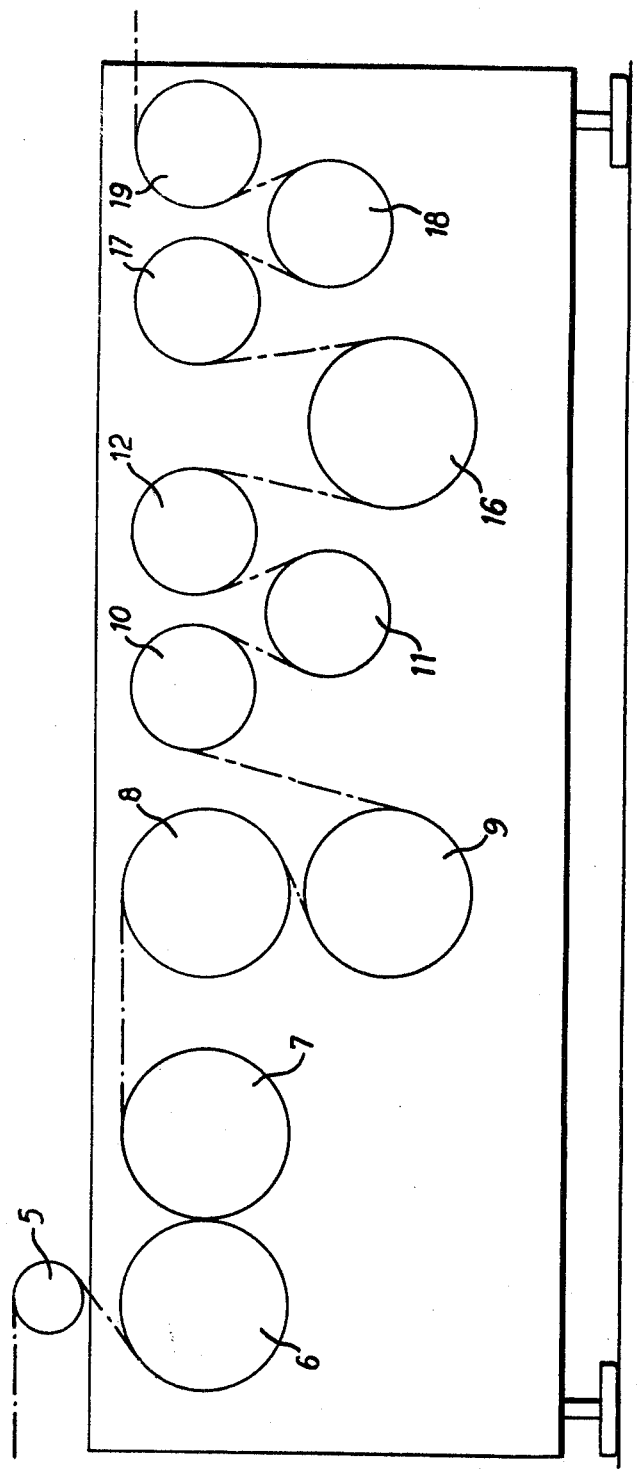

FIG. 4 illustrates a unit modified by the inclusion of a fourth section incorporating a plain heated roll 16 and a fifth section incorporating a set of plain godet rolls 17, 18, 19. The peripheral speed of the roll 16 is the same as that of the preceding godet rolls 10, 11, 12 and the peripheral speed of the final godet rolls 17, 18, 19 is less than this so that the fibres are relaxed between the fourth and fifth sections.

FIG. 5 illustrates a unit modified by the inclusion of a fourth section incorporating a pair of plain heating rolls 20, 21 and a fifth section incorporating a set of plain godet rolls 17, 18, 19. In this embodiment of the invention the peripheral speed of rolls 20, 21 is the same as the peripheral speed of rolls 10, 11, 12 but less than the peripheral speed of rolls 17, 18, 19. In this way the hot stretching is carried out in two stages, that is between the second and third sections and between the fourth and fifth sections.

FIG. 6 illustrates a unit like that of FIG. 5 except that rolls 6 and 7 are omitted and are part of a separate preceding unit.

It will be understood that the embodiments of the invention which have been illustrated in the drawings are not exhaustive, nor is the invention limited to the particular constructional details of those illustrated embodiments.

For example, in the embodiments shown in FIGS. 2 to 5, the rolls 6, 7 for profiling the film may, as in the embodiment of FIG. 6, be disposed in a preceding unit. Although rolls 6, 7 have both been described as grooved, one may be plain in some embodiments. In such a case the nature and arrangement of the grooved heating rolls 8, 9 would need to be correspondingly modified. The provision of extra rolls for heating in certain units is not precluded. The sets of godet rolls may comprise more than three, such as five or seven rolls. Although all the illustrated embodiments have been described on the basis of the treatment of an extruded single film passing to a chill roll, the film could be blown film, for example, or quenched in a water bath.

The principal benefits of the invention derive from the use of the grooved heating rolls, and the performance of these rolls, as regards the efficacy of the heating and traction can be improved by appropriately designing the groove shape, relative to the shape of the profiling rolls and the cross-sectional shape of the enlarged portions produced thereby. Thus the grooves in the heating rolls should have more sharply shaped roots than the grooves on the profiling rolls to enable the enlarged portions to sit well down in the heating roll grooves in order to get good contact for heat transfer purposes. Furthermore, since there will, inevitably be some slight stretching of the enlarged portions between the profiling rolls and the grooved heating rolls, the cross-sectional area of the enlarged portions will be correspondingly reduced. It will, therefore be desirable that the included angle of the grooves in the heating rolls be somewhat less than the included angle of the grooves in the profiling rolls, again to ensure good contact.

As has already been mentioned, the godet rolls which follow the grooved heating rolls may also have grooved peripheries in order to improve traction further and similar principles will govern the design of the groove geometry. Grooved godet rolls also assist in achieving 100 percent separation of the enlarged portions.

As far as the grooved profiling rolls are concerned, the adjacent grooves will be separated by small lands. It will be beneficial for the lands on the pressure roll to be slightly smaller than the lands on the other roll, for example about 0.025 millimetres and about 0.075 respectively. This allows for minor misalignments of the two rolls. The lands may be slightly relieved at each side so that the sides of the enlarged portions are "finned". This adds more bulk to the resultant strand.

One substantial advantage of using two grooved profiling rolls, rather than one plain roll and one grooved roll, is that, comparatively speaking, production of strands of a given size can be doubled. Thus using a plain roll and a grooved roll, for a given production of a given denier of strand-for, a certain number of grooves are required, say 16 to the centimetre with a land of 0.04 millimetres or less between each. With two grooved rolls double the production can be obtained by simply doubling the number of grooves per centrimetre, and halving the cross-sectional area of each groove in each roll thereof, that is by providing 32 grooves per centimetre on each roll.

I claim:

1. Apparatus for the treatment of films of plastics material of the type described comprising a basic unit adapted to receive such film from a supply thereof and deliver it to collection means, and including, in one section, roll means with peripheral annular grooves, and means for facilitating the heating of said roll means, whereby film, having a plurality of parallel longitudinal enlarged portions from which strands are to be produced, may, with the enlarged portions lying in said annular grooves, be progressed and at the same time heated to a temperature suitable for hot-stretching same, and, in an another, following, section, godet rolls whereby the film may be stretched in its passage between the two sections.

2. Apparatus as claimed in claim 1 further including, in a third section of said basic unit, preceding said one section, nip rolls, at least one of said rolls having peripheral annular grooves, and means for facilitating the heating of said nip rolls, whereby flat film entering the unit may be profiled to provide said enlarged portions.

3. Apparatus as claimed in claim 1 further including, in a third sectin of said basic unit, preceding said one section, a pair of nip rolls, having aligned peripheral annular grooves, and means for facilitating the heating of said nip rolls, whereby flat film entering the unit may be profiled to provide said enlarged portions.

4. Apparatus as claimed in claim 3 in which the roll means in said one section consists of two rolls, each having peripheral annular grooves, disposed adjacent each other and adapted to be rotated in opposite directions so that one side of the film may lie against one roll and the other side of the film against the other roll.

5. Apparatus as claimed in claim 1 comprising a further unit, preceding said basic unit, and including nip rolls, at least one of said rolls having peripheral annular grooves, and means for facilitating the heating of said nip rolls, whereby flat film entering said further unit may be profiled to provide said enlarged portions.

6. Apparatus as claimed in claim 1 comprising a further unit, preceding said basic unit, and including a pair of nip rolls having aligned peripheral annular grooves, and means for facilitating the heating of said nip rolls, whereby flat film entering the unit may be profiled to provide said enlarged portions.

7. Apparatus as claimed in claim 6 in which the roll menns in said one section consists of two rolls, each having peripheral annular grooves, disposed adjacent each other and adapted to be rotated in opposition so that one side of the film may lie against one roll, and the other side of the film against the other roll.

8. Apparatus as claimed in claim 1 in which the godet rolls also have peripheral annular grooves to accommodate said enlarged portions.

9. Apparatus as claimed in claim 1 in which said basic unit includes, in a terminal section following said godet rolls, crimping rolls.

10. Apparatus as claimed in claim 1 in which said basic unit includes, in additional sections immediately following said godet rolls, firstly, heating roll means, and, secondly a second set of godet rolls.

* * * * *